US007368063B2

(12) United States Patent
Kim et al.

(10) Patent No.: US 7,368,063 B2
(45) Date of Patent: May 6, 2008

(54) METHOD FOR MANUFACTURING INK-JET PRINTHEAD

(75) Inventors: Min-soo Kim, Seoul (KR); Su-ho Shin, Suwon-si (KR); Yong-soo Oh, Seongnam-si (KR); Hyung-taek Lim, Seoul (KR); Jong-woo Shin, Seoul (KR); Seog-soon Baek, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 72 days.

(21) Appl. No.: 11/367,375

(22) Filed: Mar. 6, 2006

(65) Prior Publication Data

US 2006/0146102 A1 Jul. 6, 2006

Related U.S. Application Data

(60) Division of application No. 10/853,643, filed on May 26, 2004, now Pat. No. 7,036,913, which is a continuation-in-part of application No. 10/691,588, filed on Oct. 24, 2003, now Pat. No. 6,979,076.

(30) Foreign Application Priority Data

May 27, 2003 (KR) ............................... 2003-33840

(51) Int. Cl.
*G11B 5/127* (2006.01)

(52) U.S. Cl. ............................ 216/27; 216/58; 216/75; 216/79; 216/89

(58) Field of Classification Search .................. 216/27, 216/58, 75, 79, 89
See application file for complete search history.

(56) References Cited

U.S. PATENT DOCUMENTS 4,275,290 A 6/1981 Cielo et al.
4,639,748 A 1/1987 Drake et al.
5,502,471 A 3/1996 Obermeier et al.
5,565,084 A 10/1996 Lee et al.
5,734,399 A 3/1998 Weber et al.
5,841,452 A 11/1998 Silverbrook
5,855,835 A 1/1999 Gordon et al.

(Continued)

FOREIGN PATENT DOCUMENTS

EP 0 924 077 6/1999

(Continued)

*Primary Examiner*—Binh X. Tran
(74) *Attorney, Agent, or Firm*—Lee & Morse, P.C.

(57) ABSTRACT

In an ink-jet printhead and a method for manufacturing the same, the ink-jet printhead includes a substrate, an ink chamber to be filled with ink formed on a front surface of the substrate, a manifold for supplying ink to the ink chamber formed on a rear surface of the substrate, and an ink passage in flow communication with the ink chamber and the manifold formed parallel to the front surface of the substrate; a nozzle plate including a plurality of passivation layers formed of an insulating material on the front surface of the substrate, a heat dissipating layer formed of a metallic material, and a nozzle in flow communication with the ink chamber; and a heater and a conductor, the heater being positioned on the ink chamber and heating ink in the ink chamber, and the conductor for applying a current to the heater.

20 Claims, 13 Drawing Sheets

U.S. PATENT DOCUMENTS

| | | | | |
|---|---|---|---|---|
| 5,859,654 | A | 1/1999 | Radke et al. | |
| 5,880,759 | A | 3/1999 | Silverbrook | |
| 6,019,457 | A | 2/2000 | Silverbrook | |
| 6,102,530 | A * | 8/2000 | Kim et al. | 347/65 |
| 6,260,957 | B1 | 7/2001 | Corley, Jr. et al. | |
| 6,286,941 | B1 | 9/2001 | Courian et al. | |
| 6,336,714 | B1 | 1/2002 | Kawamura et al. | |
| 6,382,782 | B1 | 5/2002 | Anagnostopoulos et al. | |
| 6,402,972 | B1 | 6/2002 | Weber et al. | |
| 6,412,918 | B1 | 7/2002 | Chen et al. | |
| 6,423,241 | B1 | 7/2002 | Yoon et al. | |
| 6,533,399 | B2 | 3/2003 | Lee et al. | |
| 6,561,625 | B2 | 5/2003 | Maeng et al. | |
| 6,561,626 | B1 | 5/2003 | Min et al. | |
| 2002/0129495 | A1 * | 9/2002 | Trueba et al. | 29/890.01 |
| 2002/0149650 | A1 | 10/2002 | Cruz-Uribe et al. | |
| 2003/0085957 | A1 | 5/2003 | Huang et al. | |
| 2003/0160842 | A1 | 8/2003 | Min et al. | |

FOREIGN PATENT DOCUMENTS

| | | |
|---|---|---|
| EP | 1 174 268 | 1/2002 |
| EP | 1 215 048 | 6/2002 |
| EP | 1 216 837 | 6/2002 |
| EP | 1 221 374 | 7/2002 |
| EP | 1 226 946 | 7/2002 |
| EP | 1 413 438 | 4/2004 |
| JP | 2002 036562 | 2/2002 |

* cited by examiner

METHOD FOR MANUFACTURING INK-JET PRINTHEAD

CROSS REFERENCE TO RELATED APPLICATION(S)

This is a divisional application based on application Ser. No. 10/853,643, filed May 26, 2004, now U.S. Pat. No. 7,036,913, which in turn is a continuation-in-part of application Ser. No. 10/691,588, filed Oct. 24, 2003, now U.S. Pat. No. 6,979,076 B2, the entire contents of both of which are hereby incorporated by reference.

BACKGROUND OF THE INVENTION

1. Field of the Invention

The present invention relates to an ink-jet printhead and a method for manufacturing the same. More particularly, the present invention relates to an ink-jet printhead, in which an ink passage is formed in a same plane as an ink chamber to improve ejection performance, a metallic nozzle plate is disposed on a substrate to improve linearity of ink droplets ejected through a nozzle, and heat generated by a heater is effectively dissipated to increase a driving frequency of the printhead, and a method for manufacturing the same.

2. Description of the Related Art

In general, ink-jet printheads are devices for printing a predetermined image, color or black, by ejecting a small volume droplet of ink at a desired position on a recording sheet. Ink-jet printheads are generally categorized into two types depending on which ink ejection mechanism is used. A first type is a thermal ink-jet printhead, in which a heat source is employed to form and expand a bubble in ink to cause an ink droplet to be ejected due to an expansion force of the formed bubble. A second type is a piezoelectric ink-jet printhead, in which an ink droplet is ejected by a pressure applied to the ink due to a deformation of a piezoelectric element.

An ink droplet ejection mechanism of a thermal ink-jet printhead will now be explained in detail. When a current pulse is supplied to a heater, which includes a heating resistor, the heater generates heat and ink near the heater is instantaneously heated to approximately 300° C., thereby boiling the ink. The boiling of the ink causes bubbles to be generated, expand and exert pressure on the ink filling an ink chamber. As a result, ink around a nozzle is ejected from the ink chamber in droplet form through the nozzle.

A thermal ink-jet printhead is classified into a top-shooting type, a side-shooting type, and a back-shooting type, depending on a growth direction of a bubble and an ejection direction of an ink droplet. In a top-shooting type printhead, a bubble grows in the same direction in which an ink droplet is ejected. In a side-shooting type of printhead, a bubble grows in a direction perpendicular to a direction in which an ink droplet is ejected. In a back-shooting type of printhead, a bubble grows in a direction opposite to a direction in which an ink droplet is ejected.

An ink-jet printhead using the thermal driving method should satisfy the following requirements. First, manufacturing of the ink-jet printheads should be simple, costs should be low, and should facilitate mass production thereof. Second, in order to obtain a high-quality image, cross talk between adjacent nozzles should be suppressed while a distance between adjacent nozzles should be narrow; that is, in order to increase dots per inch (DPI), a plurality of nozzles should be densely positioned. Third, in order to perform a high-speed printing operation, a period in which the ink chamber is refilled with ink after being ejected from the ink chamber should be as short as possible and the cooling of heated ink and heater should be performed quickly to increase a driving frequency.

FIGS. 1 through 3 illustrate various structures of conventional thermal ink-jet printheads using the back-shooting method.

FIG. 1 illustrates a perspective view of a structure of a conventional ink-jet printhead. Referring to FIG. 1, an ink-jet printhead 20 includes a substrate 11, a cover plate 3, and an ink reservoir 12. The substrate 11 has a plurality of nozzles 10 through which ink droplets are ejected and an ink chamber 16 filled with ink to be ejected. The cover plate 3 has a through hole 2 providing flow communication between the ink chamber 16 and the ink reservoir 12, which supplies ink to the ink chamber 16. In addition, a heater 42, having a ring shape, is disposed around the nozzle 10 of the substrate 11.

In the above structure, if a pulse current is applied to the heater 42 and heat is generated by the heater 42, ink in the ink chamber 16 boils and bubbles are generated and continuously expand. Due to this expansion, pressure is applied to ink filling the ink chamber 16. As a result, ink is ejected in droplet form through each of the plurality of nozzles 10. Subsequently, ink flows into the ink chamber 16 from the ink reservoir 12 through the through hole 2 formed in the cover plate 3. Thus, the ink chamber 16 is refilled with ink.

In this first conventional ink-jet printhead 20, however, a depth of the ink chamber 16 is almost the same as a thickness of the substrate 11. Thus, unless a very thin substrate is used, the size of the ink chamber 16 increases. Accordingly, pressure generated by bubbles for ejecting ink is dispersed by the ink, resulting in degradation to an ejection property. When a thin substrate is used to reduce the size of the ink chamber 16, it becomes more difficult to process the substrate 11. By way of example, a depth of the ink chamber 16 in a typical conventional ink-jet printhead is about 10-30 μm. In order to form an ink chamber having this depth, a silicon substrate having a thickness of 10-30 μm should be used. It is virtually impossible, however, to process a silicon substrate having such a thickness using existing semiconductor processes.

Further, in order to manufacture an ink-jet printhead having the above structure, the substrate 11, the cover plate 3, and the ink reservoir 12 are bonded together. Thus, a process of manufacturing such an ink-jet printhead becomes complicated, and an ink passage, which significantly affects an ejection property, cannot be very elaborate.

FIG. 2 illustrates a cross-sectional view of a structure of another conventional ink-jet printhead. Referring to FIG. 2, a hemispherical ink chamber 15 is formed in a substrate 30 formed of silicon. A manifold 26, which supplies ink to the ink chamber 15, is formed under the substrate 30. An ink channel 13, which provides flow communication between the ink chamber 15 and the manifold 26, has a cylindrical shape and is formed perpendicular to a surface of the substrate 30. A nozzle plate 20, having a nozzle 21 through which ink droplets 18 are ejected, is positioned on the surface of the substrate 30 and forms an upper wall of the ink chamber 15. A ring-shaped heater 22, which is adjacent to and surrounds the nozzle 21, is formed in the nozzle plate 20. An electric wire (not shown) for applying an electric current is connected to the heater 22.

In the above structure, if a pulse current is applied to the ring-shaped heater 22 in a stage in which the ink chamber 15 is filled with ink supplied from the manifold 26 through the ink channel 13, ink under the heater 22 boils by heat generated by the heater 22, and bubbles are generated in the ink. As a result, pressure is applied to the ink within the ink chamber 15, and ink in the vicinity of the nozzle 21 is ejected as the ink droplet 18 through the nozzle 21. Subsequently, ink flows into the ink chamber 15 through the ink channel 13, thereby refilling the ink chamber 15 with ink.

In this second conventional ink-jet printhead, only a portion of the substrate 30 is etched to form the ink chamber 15. Thus, a size of the ink chamber 15 can be reduced. In addition, because the printhead is manufactured by a batch process without a bonding process, a process of manufacturing the ink-jet printhead is simplified.

In this configuration, however, since the ink channel 13 is positioned in a same line as the nozzle 21, ink flows back toward the ink channel 13 when bubbles are generated, thereby lowering an ejection property. In addition, since the substrate 30 exposed by the nozzle 21 is etched to form the ink chamber 15, the size of the ink chamber can be reduced, but the ink chamber 15 cannot be formed with various different shapes. Thus, it is difficult to form an ink chamber having an optimum shape.

FIG. 3 illustrates a cross-sectional view of the structure of still another conventional ink-jet printhead. Referring to FIG. 3, the ink-jet printhead includes a nozzle plate 50 having a nozzle 51, an insulating layer 60 having an ink chamber 61 and an ink channel 62, and a silicon substrate 70 having a manifold 55 for supplying ink to the ink chamber 61. The nozzle plate 50, the insulating layer 60, and the silicon substrate 70 are sequentially stacked.

In this third conventional ink-jet printhead, since the ink chamber 61 is formed using the insulating layer 60 stacked on the substrate 70, the ink chamber 61 may have a variety of shapes, and a backflow of ink may be reduced.

When manufacturing this third conventional ink-jet printhead, however, a method of depositing the thick insulating layer 60 on the silicon substrate 70, etching the insulating layer 60, and forming the ink chamber 61 is generally used. This method has the following problems. First, it is difficult to stack a thick insulating layer on a substrate using existing semiconductor processes. Second, it is difficult to etch a thick insulating layer. Thus, there is a limitation on the depth of the ink chamber. As shown in FIG. 3, the ink chamber 61 and the nozzle 51 have a combined height of only about 6 μm. With such a shallow ink chamber, however, it is virtually impossible for an ink-jet printhead to have a relatively large drop size.

SUMMARY OF THE INVENTION

The present invention is therefore directed to an ink-jet printhead having an improved structure in which an ink passage is formed in a same plane as an ink chamber to improve ejection performance, a metallic nozzle plate is disposed on a substrate to improve linearity of ink droplets ejected through a nozzle, and heat generated by a heater is effectively dissipated to increase a driving frequency of the printhead, and a method for manufacturing the same, which substantially overcome one or more of the problems due to the limitations and disadvantages of the related art.

It is therefore a feature of an embodiment of the present invention to provide an ink-jet printhead including a substrate, an ink chamber to be filled with ink to be ejected being formed on a front surface of the substrate, a manifold for supplying ink to the ink chamber being formed on a rear surface of the substrate, and an ink passage in flow communication with the ink chamber and the manifold being formed parallel to the front surface of the substrate; a nozzle plate formed on the front surface of the substrate, the nozzle plate including a plurality of passivation layers formed of an insulating material, a heat dissipating layer formed of a metallic material having good thermal conductivity, and a nozzle in flow communication with the ink chamber; and a heater and a conductor, which are disposed between adjacent passivation layers of the nozzle plate, the heater being positioned on the ink chamber and heating ink in the ink chamber, and the conductor for applying a current to the heater.

The ink passage may be formed in a same plane as the ink chamber. The ink passage may include an ink channel adjacent to and in flow communication with the ink chamber and an ink feed hole adjacent to and in flow communication with the ink channel and the manifold.

The plurality of passivation layers may include a first passivation layer, a second passivation layer, and a third passivation layer, which are sequentially stacked on the substrate, and wherein the heater is disposed between the first passivation layer and the second passivation layer, and the conductor is disposed between the second passivation layer and the third passivation layer.

A lower portion of the nozzle may be formed in the plurality of the passivation layers, and an upper portion of the nozzle may be formed in the heat dissipating layer.

The upper portion of the nozzle formed in the heat dissipating layer may have a tapered shape such that a diameter thereof becomes smaller in a direction of an outlet.

The heat dissipating layer may be formed of at least one metallic layer, and each of the metallic layers may be formed of at least one material selected from the group consisting of nickel (Ni), copper (Cu), aluminum (Al), and gold (Au). The heat dissipating layer may be formed to a thickness of about 10-100 μm by electroplating.

A seed layer for electroplating the heat dissipating layer may be formed on the plurality of passivation layers. The seed layer may be formed of at least one metallic layer, and each of the at least one metallic layer may be formed of at least one material selected from the group consisting of copper (Cu), chromium (Cr), titanium (Ti), gold (Au), and nickel (Ni).

It is therefore another feature of an embodiment of the present invention to provide a method for manufacturing an ink-jet printhead including forming a sacrificial layer having a predetermined depth on a front surface of a substrate; sequentially stacking a plurality of passivation layers on the front surface of the substrate, on which the sacrificial layer is formed, and forming a heater and a conductor connected to the heater between adjacent passivation layers; forming a heat dissipating layer of metal on the plurality of passivation layers and forming a nozzle, through which ink is ejected, through the heat dissipating layer and the plurality of passivation layers to expose the sacrificial layer; forming a manifold for supplying ink on a rear surface of the substrate; removing the sacrificial layer to form an ink chamber and an ink passage; and providing flow communication between the manifold and the ink passage.

Forming the sacrificial layer may include etching the front surface of the substrate to form a groove having a predetermined depth, oxidizing the front surface of the substrate in which the groove is formed to form an oxide layer, and filling the groove with a predetermined material and planarizing the front surface of the substrate. Filling the groove with the predetermined material may include epitaxially growing polysilicon in the groove.

Alternatively, forming the sacrificial layer may include forming a trench exposing an insulating layer in a predetermined shape in an upper silicon substrate of a SOI substrate and filling the trench with a predetermined material. That predetermined material may be silicon oxide.

Forming the plurality of passivation layers may include forming a first passivation layer on the front surface of the substrate on which the sacrificial layer is formed, forming the heater on the first passivation layer, forming a second passivation layer on the first passivation layer and the heater, forming the conductor on the second passivation layer, and forming a third passivation layer on the second passivation layer and the conductor.

The heat dissipating layer may be formed of at least one metallic layer, and each of the at least one metallic layer may be formed by electroplating at least one material selected from the group consisting of nickel (Ni), copper (Cu), aluminum (Al), and gold (Au). The heat dissipating layer may be formed to a thickness of 10-100 μm.

Forming the heat dissipating layer and the nozzle may include etching the plurality of passivation layers formed on the sacrificial layer to form a lower nozzle, forming a lower plating mold inside the lower nozzle, forming an upper plating mold having a predetermined shape for forming the upper nozzle on the lower plating mold, forming the heat dissipating layer on the plurality of passivation layers by electroplating, and removing the upper and lower plating molds to form the nozzle having the upper nozzle and the lower nozzle. The lower plating mold and the upper plating mold may be formed of a photoresist or photosensitive polymer.

Alternatively, forming the heat dissipating layer and the nozzle may include etching the plurality of passivation layers formed on the sacrificial layer to form a lower nozzle, forming a plating mold having a predetermined shape for forming an upper nozzle vertically from an inside of the lower nozzle, forming the heat dissipating layer on the plurality of passivation layers by electroplating, and removing the plating mold and forming the nozzle having the upper nozzle and the lower nozzle. The plating mold may be formed of a photoresist or a photosensitive polymer.

The lower nozzle may be formed by dry etching the plurality of passivation layers by a reactive ion etching (RIE).

Forming the heat dissipating layer and the nozzle may further include forming a seed layer for electroplating the heat dissipating layer on the plurality of passivation layers. The seed layer may be formed of at least one metallic layer, and each of the at least one metallic layer may be formed by depositing at least one metallic material selected from the group consisting of copper (Cu), chromium (Cr), titanium (Ti), gold (Au), and nickel (Ni).

Forming the heat dissipating layer and the nozzle may further include planarizing the top surface of the heat dissipating layer by a chemical mechanical polishing (CMP) process, after forming the heat dissipating layer.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
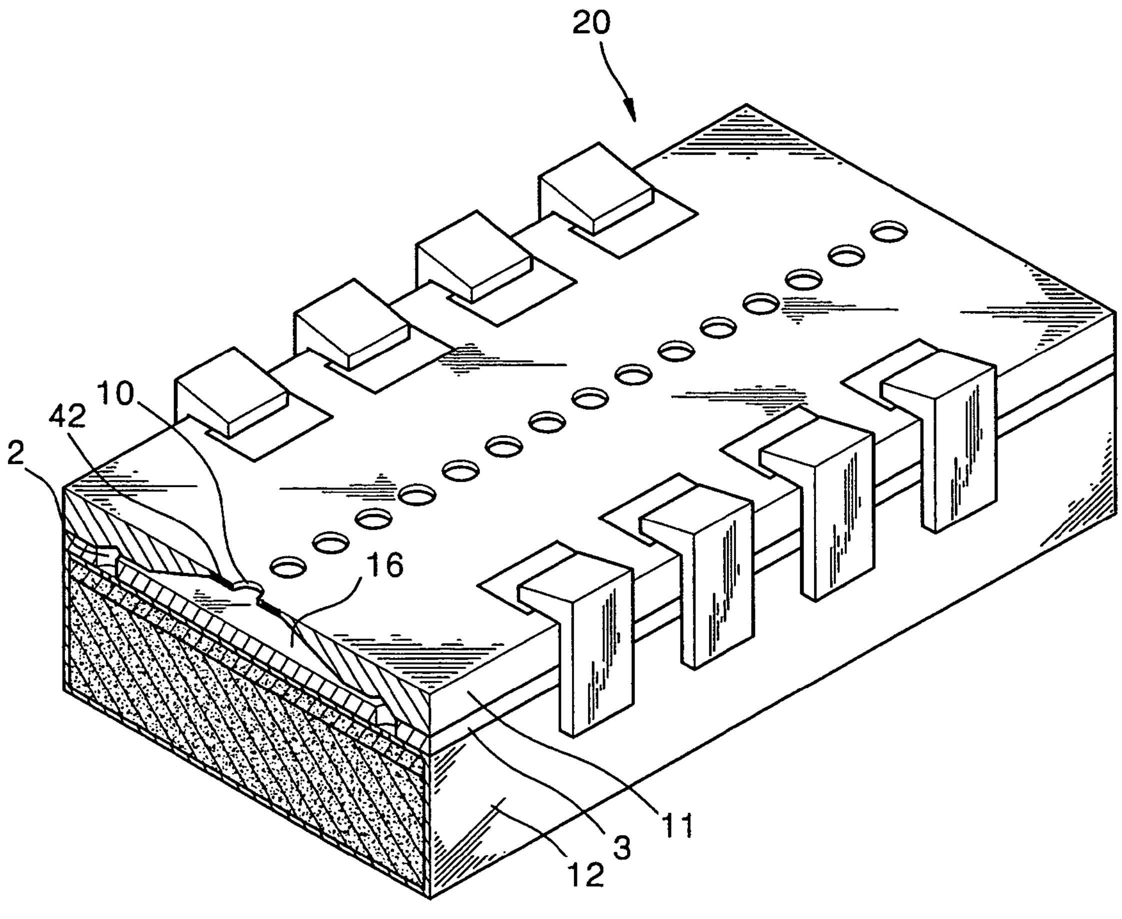
FIG. 1 (PRIOR ART)
FIG. 1 illustrates a perspective view of an example of a conventional ink-jet printhead.
Figure 2:
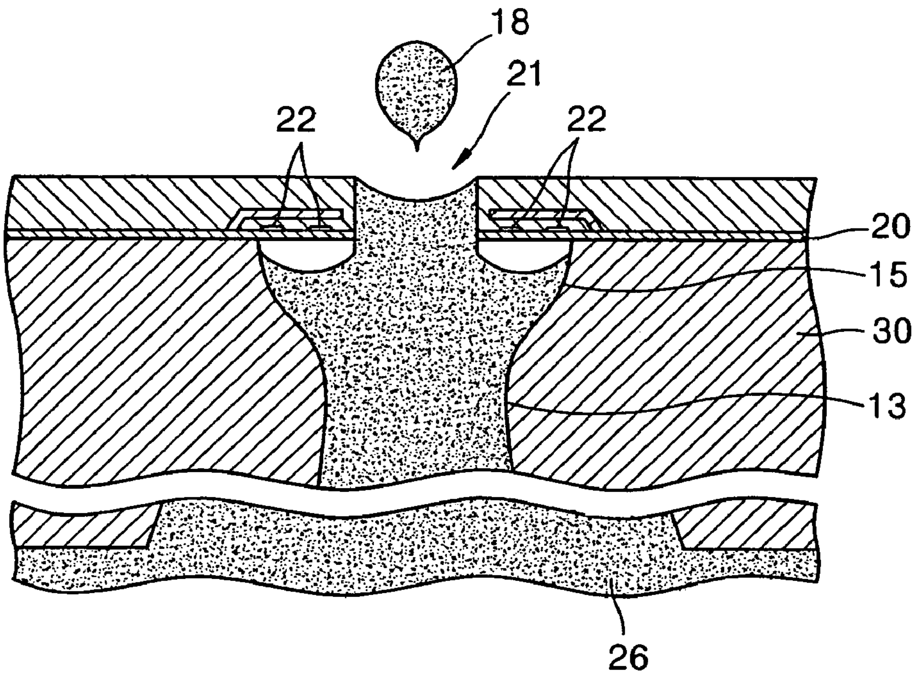
FIG. 2 (PRIOR ART)
FIG. 2 illustrates a cross-sectional view of another example of a conventional ink-jet printhead.
Figure 3:
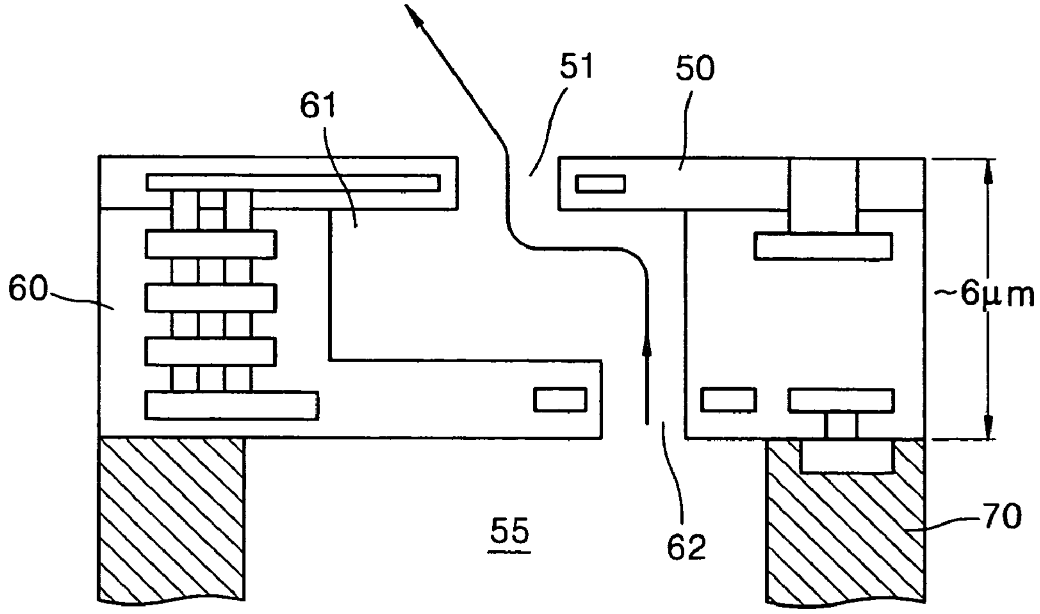
FIG. 3 (PRIOR ART)
FIG. 3 illustrates a cross-sectional view of still another example of a conventional ink-jet printhead.

Korean Patent Application No. 2003-33840, filed on May 27, 2003, in the Korean Intellectual Property Office, and entitled: "Ink-Jet Printhead and Method for Manufacturing the Same," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 4:
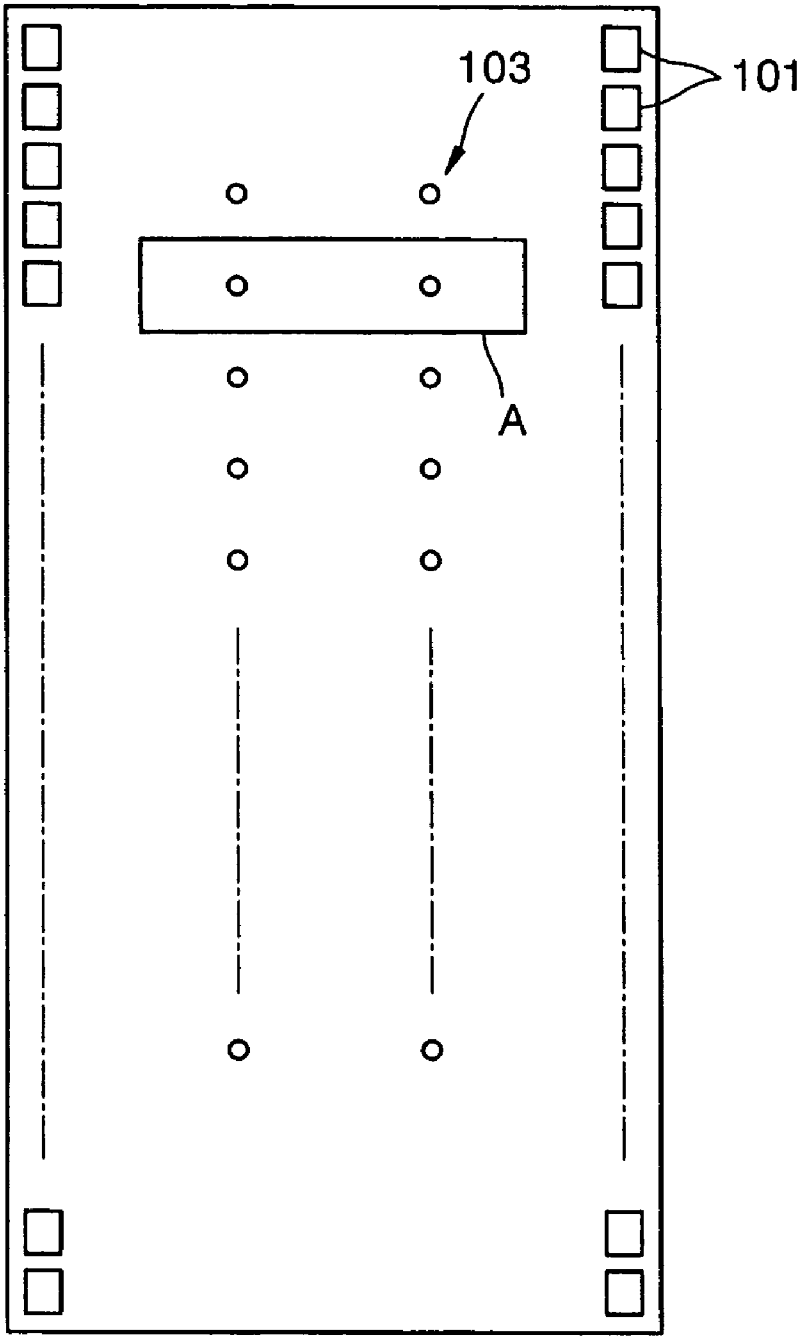
FIG. 4 illustrates a plan view of an ink-jet printhead according to an embodiment of the present invention.

FIG. 4 illustrates a plan view of an ink-jet printhead according to an embodiment of the present invention. Referring to FIG. 4, the ink-jet printhead includes ink ejecting portions 103 exemplarily arranged in two rows and bonding pads 101, each of which are electrically connected to one of the ink ejecting portions 103. In alternative embodiments, the ink ejecting portions 103 may be arranged in one row, or in three or more rows to improve printing resolution.

Figure 5:
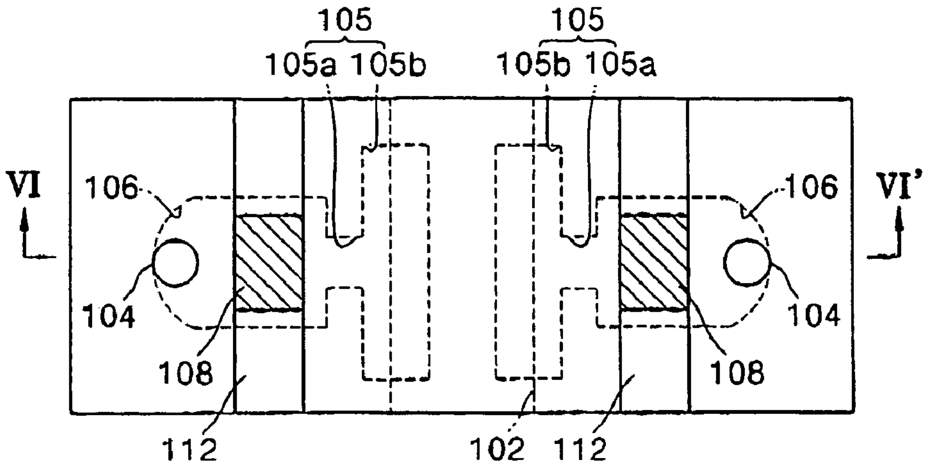
FIG. 5 illustrates an enlarged plan view of a portion A of FIG. 4.
Figure 6:
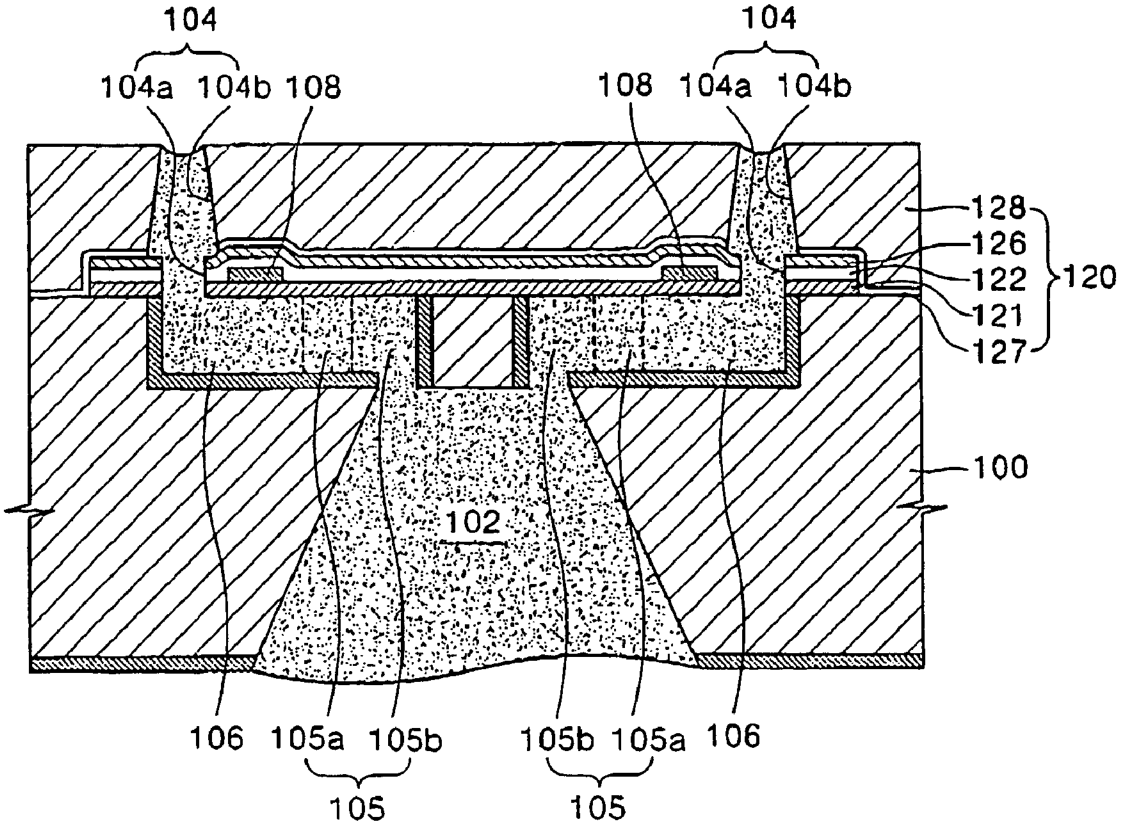
FIG. 6 illustrates a cross-sectional view of the ink-jet printhead taken along line VI-VI' of FIG. 5.
Figure 7:
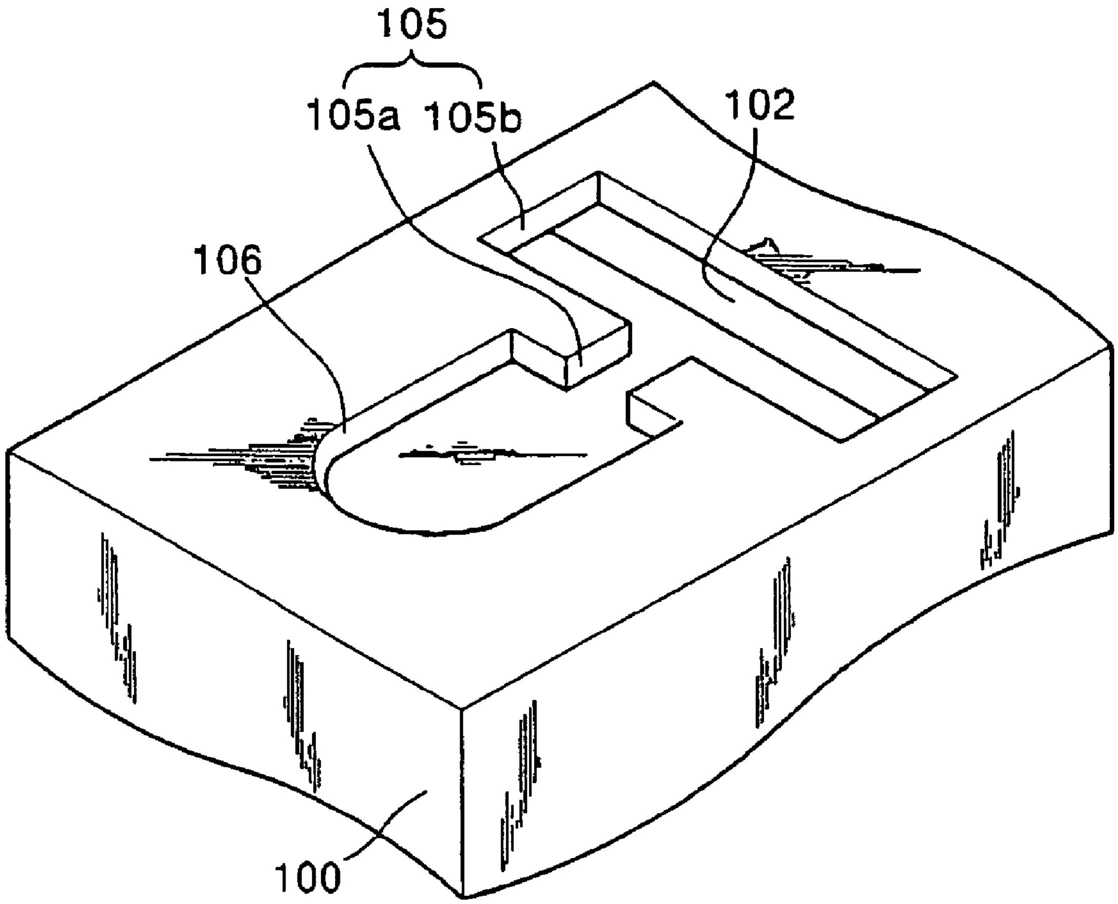
FIG. 7 illustrates a partial perspective view of a substrate on which an ink chamber and an ink passage are formed.

FIG. 5 illustrates an enlarged plan view of a portion A of FIG. 4. FIG. 6 illustrates a cross-sectional view of a vertical structure of the ink-jet printhead taken along line VI-VI' of FIG. 5. FIG. 7 illustrates a partial perspective view of a substrate showing an ink chamber and an ink passage, which are formed on a front surface of the substrate.

Referring to FIGS. 5, 6, and 7, an ink chamber 106 to be filled with ink is formed on the front surface of a substrate 100 to a predetermined depth. A manifold 102, which supplies ink to the ink chamber 106, is formed on a rear surface of the substrate 100.

Here, since each of the front surface and the rear surface of the substrate 100 is etched to form the ink chamber 106 and the manifold 102, respectively, the ink chamber 106 and the manifold 102 may have a variety of shapes. Here, the ink chamber 106 may be formed to a depth of about 10-80 μm. The manifold 102 formed under the ink chamber 106 is in flow communication with an ink reservoir (not shown).

An ink passage 105 for providing flow communication between the ink chamber 106 and the manifold 102 is formed on the front surface of the substrate 100. Here, like the ink chamber 106, the front surface of the substrate 100 is etched to form the ink passage 105. Accordingly, the ink passage 105 may have a variety of shapes. The ink passage 105 is formed parallel to the front surface of the substrate 100, in a same plane as the ink chamber 106. The ink passage 105 includes an ink channel **105*a* and an ink feed hole 105*b*. The ink channel 105*a* is adjacent to and in flow communication with the ink chamber 106, and the ink feed hole 105*b* is adjacent to and in flow communication with the ink channel 105*a* and the manifold 102. A plurality of ink channels 105*a*** may be formed in consideration of an ejection property.

A nozzle plate 120 is disposed on the front surface of the substrate 100, on which the ink chamber 106, the ink passage 105, and the manifold 102 are formed. The nozzle plate 120 forms an upper wall of the ink chamber 106 and the ink passage 105. A nozzle 104, through which ink is ejected from the ink chamber 106, is vertically formed through the nozzle plate 120.

The nozzle plate 120 may be formed of a plurality of material layers stacked on the substrate 100. The plurality of material layers may include a first, a second, and a third passivation layer 121, 122, and 126, and a heat dissipation layer 128 formed of metal. A heater 108 may be disposed between the first passivation layer 121 and the second passivation layer 122. A conductor (112 of FIG. 5) is disposed between the second passivation layer 122 and the third passivation layer 126.

The first passivation layer 121 is a lowermost material layer of the plurality of material layers, which are components of the nozzle plate 120, and is formed on the front surface of the substrate 100. The first passivation layer 121 is formed to provide insulation between the heater 108 and the substrate 100 and to protect the heater 108. The first passivation layer 121 may be formed of silicon oxide or silicon nitride.

The heater 108, which heats ink in the ink chamber 106, is disposed on the first passivation layer 121 formed on the ink chamber 106. In alternative embodiments, a plurality of heaters 108 may be formed and may have a variety of positions and shapes, which are different from those shown in FIGS. 5, 6, and 7. By way of example, the heater 108 may be formed in a ring shape around the nozzle 104. The heater 108 is formed of a resistive heating material, such as impurity-doped polysilicon, tantalum-aluminum alloy, tantalum nitride, titanium nitride, or tungsten silicide.

The second passivation layer 122 is formed on the first passivation layer 121 and the heater 108. The second passivation layer 122 is formed to protect the heater 108 and may be formed of silicon nitride or silicon oxide, like the first passivation layer 121.

Although not shown in FIG. 6, the conductor (112 of FIG. 5), which is electrically connected to the heater 108 and applies a pulse current to the heater 108, may be formed on the second passivation layer 122. A first end of the conductor (112 of FIG. 5) is connected to the heater 108 via a contact hole formed in the second passivation layer 122. A second end of the conductor is electrically connected to a bonding pad (101 of FIG. 4). The conductor (112 of FIG. 5) may be formed of metal having good electrical conductivity, e.g., aluminum (Al), aluminum alloy, gold (Au), or silver (Ag).

The third passivation layer 126 is formed on the conductor (112 of FIG. 5) and the second passivation layer 122. The third passivation layer 126 may be formed of tetraethylorthosilicate (TEOS) oxide or silicon oxide.

The heat dissipating layer 128, formed on the third passivation layer 126, is the uppermost material layer of the plurality of material layers that are components of the nozzle plate 120. The heat dissipating layer 128 may be formed of a metallic material having good thermal conductivity, such as nickel (Ni), copper (Cu), aluminum (Al), or gold (Au). In addition, the heat dissipating layer 128 may be formed of a plurality of metallic layers. The heat dissipating layer 128 may be formed to a relatively large thickness of about 10-100 μm by electroplating the above-described metallic material. To accomplish this electroplating, a seed layer 127 for electroplating the above-described metallic material may be formed on a top surface of the third passivation layer 126 and at both sides of the front surface of the substrate 100. The seed layer 127 may be formed of a metallic material having good electrical conductivity, such as copper (Cu), chromium (Cr), titanium (Ti), gold (Au), and nickel (Ni). In addition, the seed layer 127 may be formed of a plurality of metallic layers.

In operation, the heat dissipating layer 128 dissipates heat generated by and remaining around the heater 108. More specifically, heat generated by and remaining around the heater 108 after ink is ejected is dissipated to the substrate 100 and out of the printhead via the heat dissipating layer 128. Thus, heat is dissipated after ink is ejected and the temperature around the nozzle 104 falls rapidly so that printing can be performed stably at a high driving frequency.

As described above, since the heat dissipating layer 128 may be formed to a relatively large thickness, the nozzle 104 can be formed to have a sufficient length. Thus, a stable high-speed operation can be performed, and a linearity of ink droplets ejected through the nozzle 104 is improved. That is, the ink droplets can be ejected in a direction exactly perpendicular to the substrate 100.

In this particular embodiment, each of the plurality of nozzles 104 includes a lower nozzle **104*a* and an upper nozzle 104*b*. The lower nozzle 104*a* has a cylindrical shape and is formed in the first, second, and third passaivation layers 121, 122, and 126. The upper nozzle 104*b* has a tapered shape such that a diameter thereof becomes smaller in a direction of an outlet in the heat dissipating layer 128. Since the upper nozzle 104 has a tapered shape, a meniscus at a surface of ink in the nozzle 104** is more quickly stabilized after ink is ejected.

An operation of ejecting ink from the ink-jet printhead having the above structure will now be described.

First, if a pulse current is applied to the heater 108 via the conductor 112 in a stage in which the ink chamber 106 and the nozzle 104 are filled with ink, heat is generated by the heater 108 and transferred to the ink in the ink chamber 106 through the first passivation layer 121 formed under the heater 108. As a result, the ink boils, and a bubble is generated. The bubble expands due to a continuous supply of heat, causing ink to protrude from the nozzle 104.

Subsequently, when the applied current is cut off, the bubble contracts and collapses, causing ink that has protruded from the nozzle 104 to be ejected in droplet form. Meanwhile, since heat generated by and remaining around the heater 108 after ink is ejected is dissipated to the substrate 100 and out of the printhead via the heat dissipating layer 128, the temperature around the heater 108 decreases.

Next, the ink chamber 106 is refilled with ink supplied from the manifold 102 through the ink channel 105*a* and the ink feed hole 105*b*. When ink refilling is completed and the ink-jet printhead returns to an initial state thereof, the above-described cycle is repeated.

In the ink-jet printhead according to the above-described embodiment of the present invention, because the ink passage 105 is formed parallel to the front surface of the substrate 100 in the same plane as the ink chamber 106, a backflow of ink may be reduced. Since the ink chamber 106 and the ink passage 105 are formed using an etching method, they may have a variety of shapes. Thus, the ink chamber 106 and the ink passage 105 may be formed to have optimum shapes. In addition, since the metal heat dissipating layer 128 may be formed by electroplating, it may be formed as a single body with the other elements of the ink-jet printhead and formed to a relatively large thickness, and heat can be effectively dissipated.

A method for manufacturing an ink-jet printhead according to an embodiment of the present invention will now be described.

FIGS. 8 through 19 illustrate cross-sectional views of stages in a method for manufacturing an ink-jet printhead according to an embodiment of the present invention.

Figure 8:
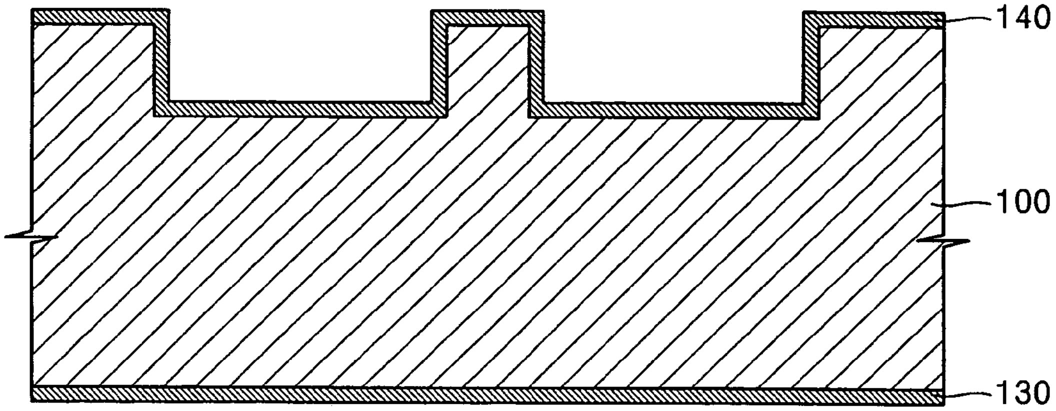
FIGS. 8 through 19 illustrate cross-sectional views of stages in a method for manufacturing an ink-jet printhead according to an embodiment of the present invention.

FIG. 8 illustrates a stage in which a groove is formed on the front surface of the substrate 100, and the substrate 100 is oxidized to form silicon oxide layers 140 and 130 on the front and rear surfaces of the substrate 100, respectively.

First, in the present embodiment, a silicon wafer processed to a thickness of about 300-700 μm is used as the substrate 100. Silicon wafers are widely used to manufacture semiconductor devices, and thus facilitate mass production of a printhead. While FIG. 8 illustrates only a portion of a silicon wafer, several tens to hundreds of chips corresponding to ink-jet printheads maybe contained in a single wafer.

An etching mask for defining a portion to be etched is formed on a top, i.e., the front, surface of the silicon substrate 100. A photoresist is coated on the top surface of the substrate 100 to a predetermined thickness and is patterned, thereby forming the etch mask.

Subsequently, the substrate 100 exposed by the etch mask is etched, thereby forming a groove having a predetermined shape. The substrate 100 may be etched by a dry etching, such as a reactive ion etching (RIE). The groove is a portion in which an ink chamber (106 of FIG. 6) and an ink passage (105 of FIG. 6) are to be formed. Preferably, a depth of the groove is about 10-80 μm. The groove may have a variety of shapes depending on the shape in which the front surface of the substrate 100 is etched. Thus, the ink chamber and the ink passage can be formed to have desired shapes. After the groove is formed, the etch mask is removed from the substrate 100.

Subsequently, the substrate 100 on which the grove is formed is oxidized to form the silicon oxide layers 140 and 130 on the front and rear surfaces of the substrate 100, respectively.

Figure 9:
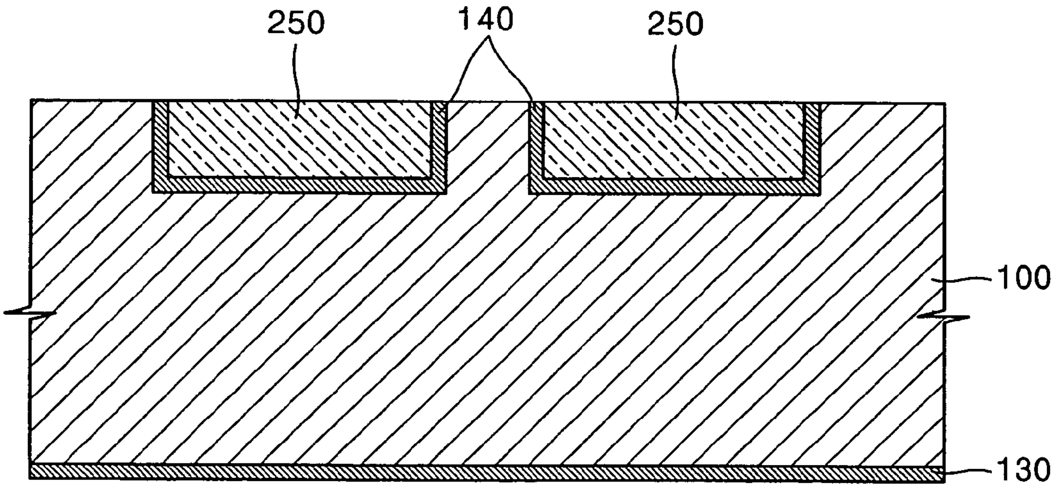

FIG. 9 illustrates a stage in which a sacrificial layer 250 is formed in the groove formed on the substrate 100 and the front surface of the substrate 100 is planarized.

Specifically, for this particular embodiment, polysilicon is epitaxially grown in the groove formed on the front surface of the oxidized substrate 100, thereby forming the sacrificial layer 250. Next, the sacrificial layer 250 and the front surface of the substrate 100 are planarized by a chemical mechanical polishing (CMP) process. Here, the silicon oxide layer 140 protruding from the groove is removed.

Figure 10:
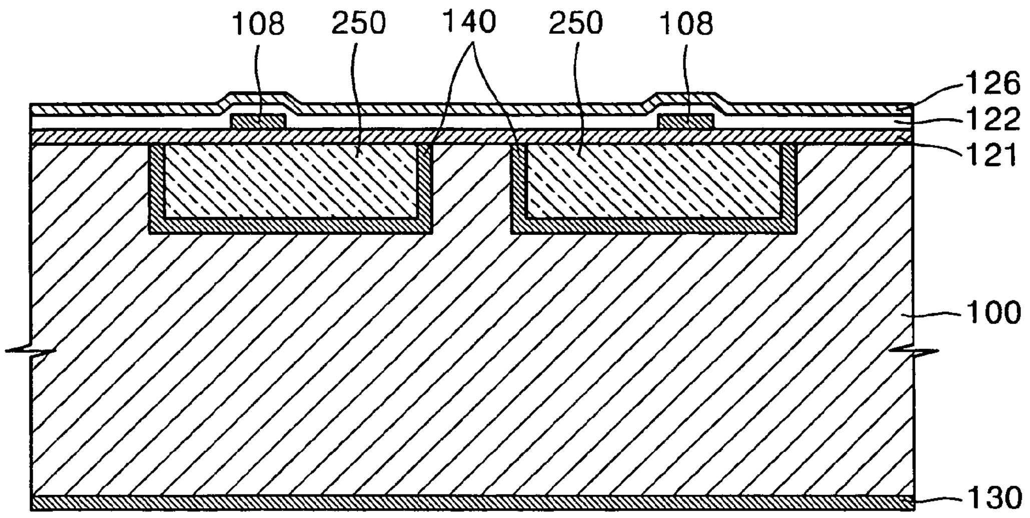

FIG. 10 illustrates a stage in which the first passivation layer 121, the heater 108, the second passivation layer 122, the conductor (112 of FIG. 5), and the third passivation layer 126 are sequentially stacked on the entire surface of the structure shown in FIG. 9.

Specifically, the first passivation layer 121 is formed on the front surface of the planarized substrate 100. The first passivation layer 121 may be formed by depositing silicon oxide or silicon nitride.

Next, the heater 108 is formed on the first passivation layer 121. The heater 108 is formed by depositing a resistive heating material, such as impurity-doped polysilicon, tantalum-aluminum alloy, tantalum nitride, or tungsten silicide, on the entire surface of the first passivation layer 121 to a predetermined thickness and patterning the deposited material in a predetermined shape. Specifically, impurity-doped polysilicon may be formed to a thickness of about 0.7-1 μm by depositing polysilicon together with impurities, e.g., a source gas of phosphorous (P), by low-pressure chemical vapor deposition (LP-CVD). When the heater 108 is formed of tantalum-aluminum alloy, tantalum nitride, or tungsten silicide, the heater 108 may be formed to a thickness of about 0.1-0.3 μm by depositing tantalum-aluminum alloy, tantalum nitride, or tungsten silicide by sputtering or chemical vapor deposition (CVD). The deposition thickness of the resistive heating material may be varied so as to have proper resistance in consideration of the width and length of the heater 108. Subsequently, the resistive heating material deposited on the entire surface of the first passivation layer 121 is patterned by a photolithographic process using a photomask and a photoresist and an etch process using a photoresist pattern as an etch mask.

Next, the second passivation layer 122 formed of silicon oxide or silicon nitride may be formed to a thickness of about 0.2-1 μm by depositing silicon oxide or silicon nitride on the entire surface of the first passivation layer 121 on which the heater 108 is formed. Subsequently, the second passivation layer 122 is etched to form a contact hole (not shown) through which the heater 108 is exposed to be connected to the conductor (112 of FIG. 5).

Subsequently, the conductor (112 of FIG. 5) is formed by depositing metal having good electrical conductivity, such as aluminum (Al), aluminum alloy, gold (Au), or silver (Ag), on the entire surface of the second passivation layer 122 to a thickness of about 0.5-2 μm through sputtering and patterning the deposited metal. Then, the conductor (112 of FIG. 5) is connected to the heater 108 via the contact hole (not shown).

Next, the third passivation layer 126 is formed on top surfaces of the second passivation layer 122 and the conductor (112 of FIG. 5). The third passivation layer 126 is a material layer that provides insulation between the conductor (112 of FIG. 5) and the heat dissipating layer (128 of FIG. 6) that will be formed later. The third passivation layer 126 may be formed to a thickness of about 0.7-3 μm by depositing TEOS oxide using plasma-enhanced chemical vapor deposition (PE-CVD).

Figure 11:
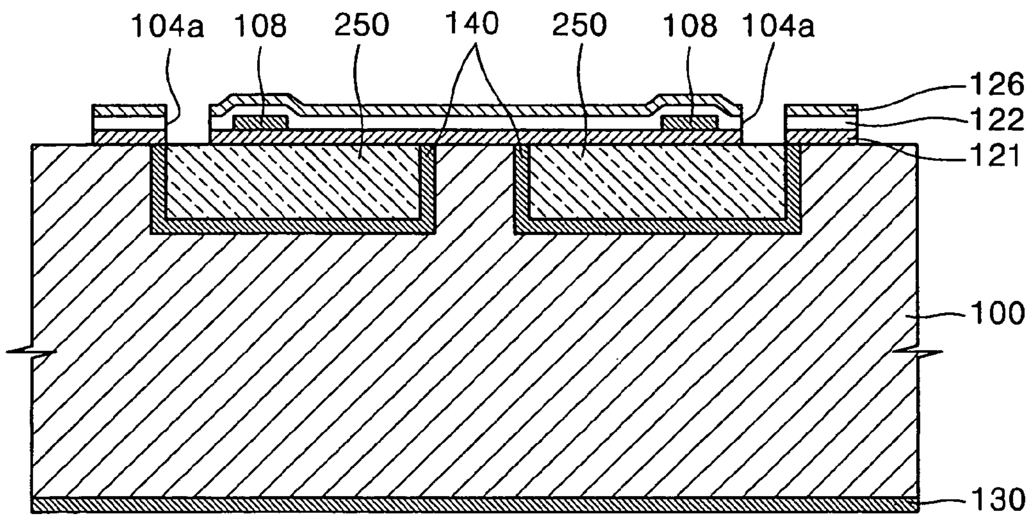

FIG. 11 illustrates a stage in which the lower nozzle 104*a* is formed. The lower nozzle 104*a* may be formed by sequentially etching the third passivation layer 126, the second passivation layer 122, and the first passivation layer 121 through RIE such that a portion of the sacrificial layer 250 formed on the front surface of the substrate 100 and both sides of the front surface of the substrate 100 is exposed.

Figure 12:
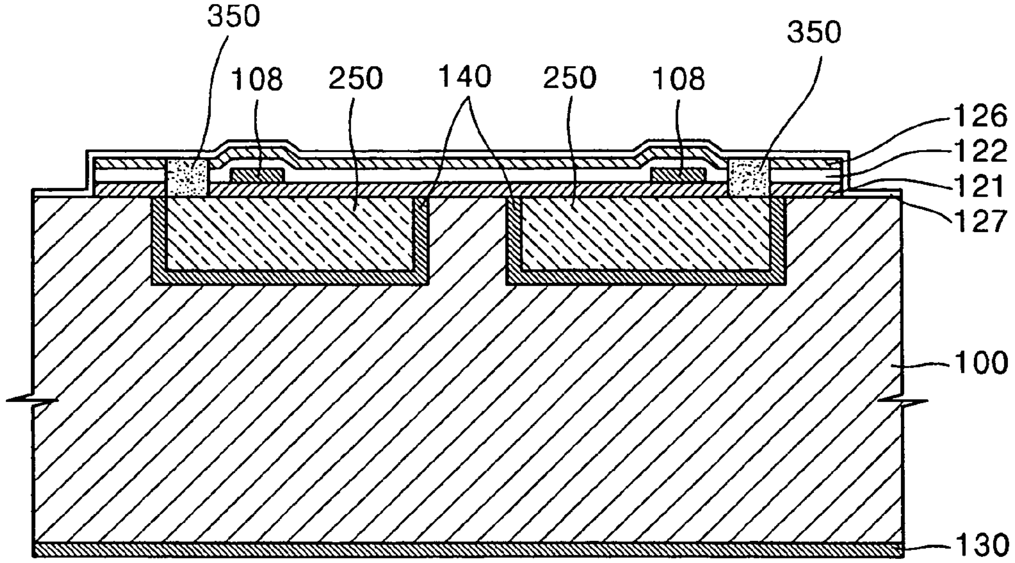

FIG. 12 illustrates a stage in which a lower plating mold 350 is formed in the lower nozzle 104*a* and the seed layer 127 is formed on the lower plating mold 350. Specifically, the lower plating mold 350 may be formed by coating a photoresist on the entire surface of the structure shown in FIG. 11 to a predetermined thickness, patterning a coated photoresist, and leaving the photoresist only inside the lower nozzle 104*a*. The lower plating mold 350 may be formed of a photoresist or a photosensitive polymer.

Subsequently, the seed layer 127 for electroplating is formed on the entire surface of the structure shown in FIG. 12. For electroplating, the seed layer 127 may be formed to a thickness of about 500-3000 Å by depositing metal having good conductivity, such as copper (Cu), chromium (Cr), titanium (Ti), gold (Au), and nickel (Ni), by sputtering. Alternatively, the seed layer 127 may be formed of a plurality of metallic layers.

Figure 13:
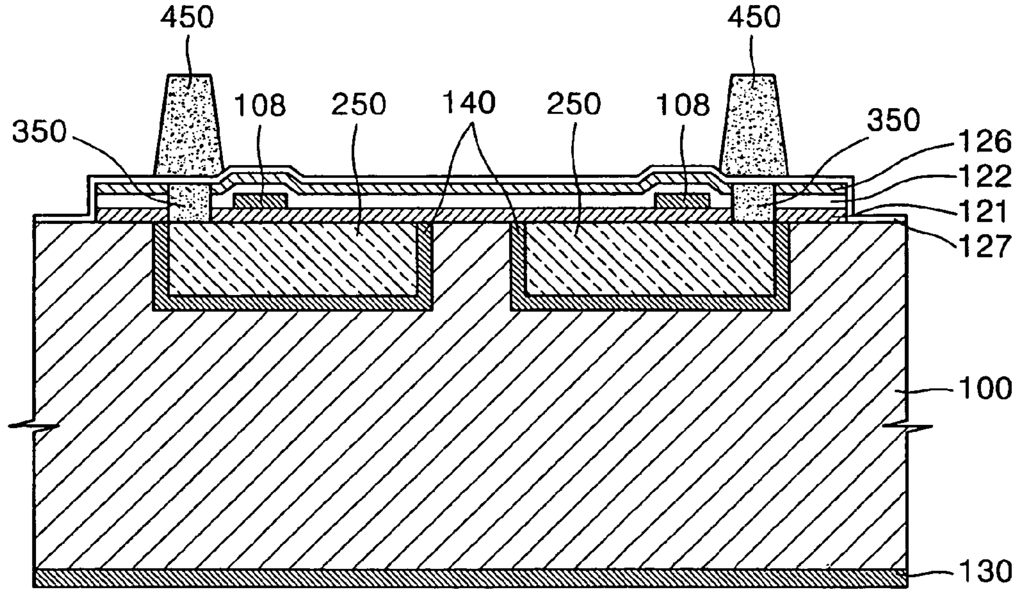

FIG. 13 illustrates a stage in which an upper plating mold 450 for forming the upper nozzle (104*b* of FIG. 6) is formed. The upper plating mold 450 may be formed by coating a photoresist on the entire surface of the seed layer 127, patterning the coated photoresist, and leaving photoresist only where the upper nozzle (104*b* of FIG. 6) is to be formed. The upper plating mold 450 may be formed of a photoresist or photosensitive polymer. The upper plating mold 450 has a tapered shape such that a diameter thereof becomes smaller as the upper plating mold 450 extends upward. Alternatively, the upper nozzle (104*b* of FIG. 6) may have a cylindrical shape. In this case, the upper plating mold 450 may have a pillar shape.

Figure 19:
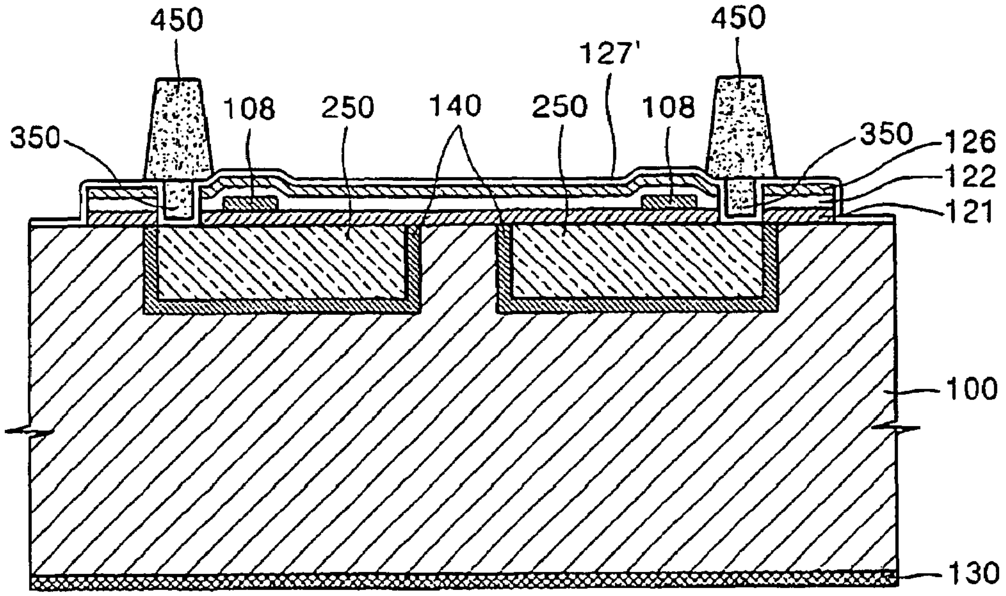

Alternatively, the lower plating mold 350 and the upper plating mold 450 may be formed by the following steps. Referring now to FIG. 19, prior to forming the lower plating mold 350, a seed layer 127' for electroplating is formed on the entire surface of the structure shown in FIG. 11. Subsequently, the lower plating mold 350 and the upper plating mold 450 are sequentially formed. Alternatively, the lower and upper plating molds 350 and 450 may be formed of a single body.

Figure 14:
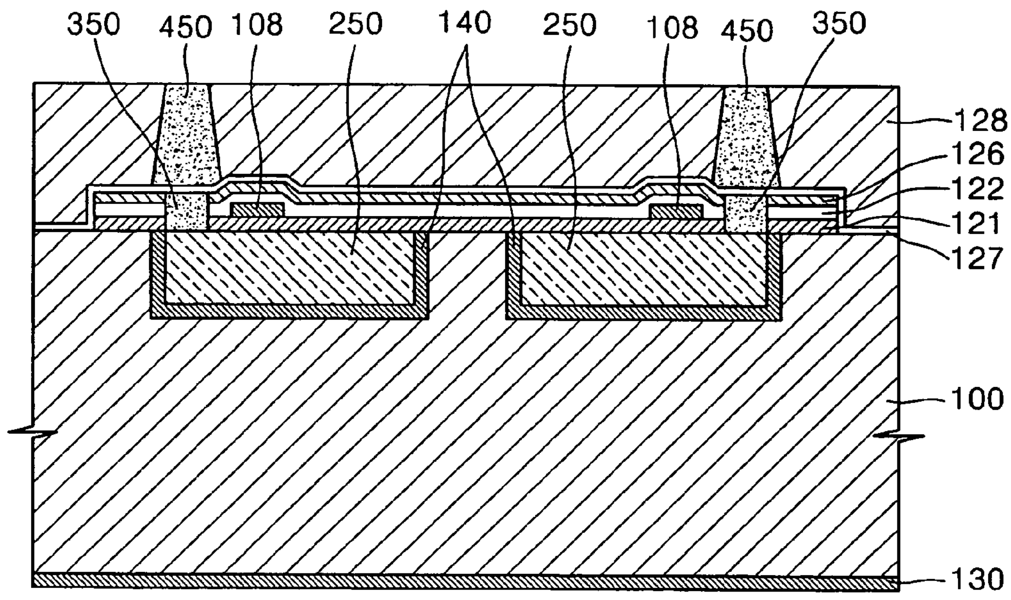

FIG. 14 illustrates a stage in which the heat dissipating layer 128 formed of a metallic material having a predetermined thickness is formed on a top surface of the seed layer 127. The heat dissipating layer 128 may be formed to a thickness of about 10-100 μm by electroplating metal having good thermal conductivity, such as nickel (Ni), copper (Cu), aluminum (Al), or gold (Au), on the surface of the seed layer 127. Alternatively, the heat dissipating layer 128 may be formed of a plurality of metallic layers. The thickness of the heat dissipating layer 128 may be determined in consideration of a cross-sectional area and shape of the upper nozzle and a heat dissipating capability to the substrate 100 and out of the printhead.

The surface of the heat dissipating layer 128 after electroplating is completed is uneven due to the material layers formed under the heat dissipating layer 128. Thus, the surface of the heat dissipating layer 128 can be planarized by CMP.

Figure 15:
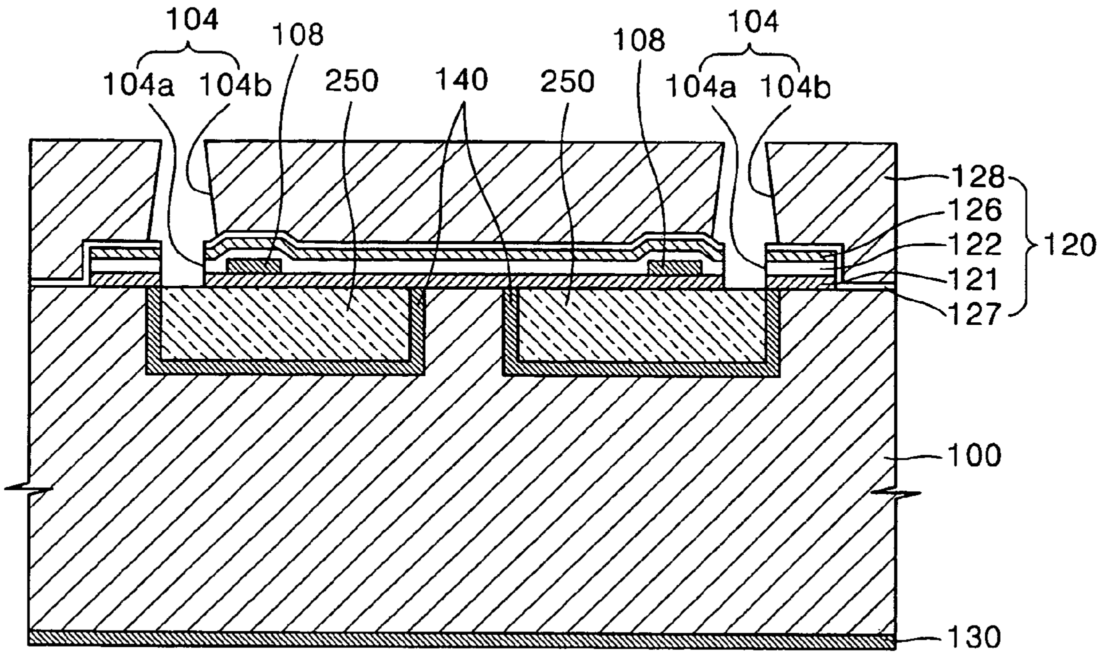

Subsequently, the upper plating mold 450, the seed layer 127 formed under the upper plating mold 450, and the lower plating mold 350 are sequentially removed. The upper and lower plating molds 450 and 350 may be removed using a general method of removing a photoresist. The seed layer 127 may be etched by wet etching using an etchant capable of selectively etching the seed layer 127 in consideration of etch selectivity of the metallic material used to form the heat dissipating layer 128 to the metallic material used to form the seed layer 127. For example, when the seed layer 127 is formed of copper (Cu), an acetic acid based etchant may be used, and when the seed layer 127 is formed of titanium (Ti), a hydrofluoric acid (HF) based etchant may be used. Then, as shown in FIG. 15, the lower nozzle 104*a* and the upper nozzle 104*b* are in flow communication with each other, thereby forming a complete nozzle 104 and completing the nozzle plate 120 formed of a stack of a plurality of material layers. In this configuration, a partial surface of the sacrificial layer 250 that occupies a space in which the ink chamber (106 of FIG. 6) and the ink passage (105 of FIG. 6) are to be formed, is exposed through the nozzle 104.

Figure 16:
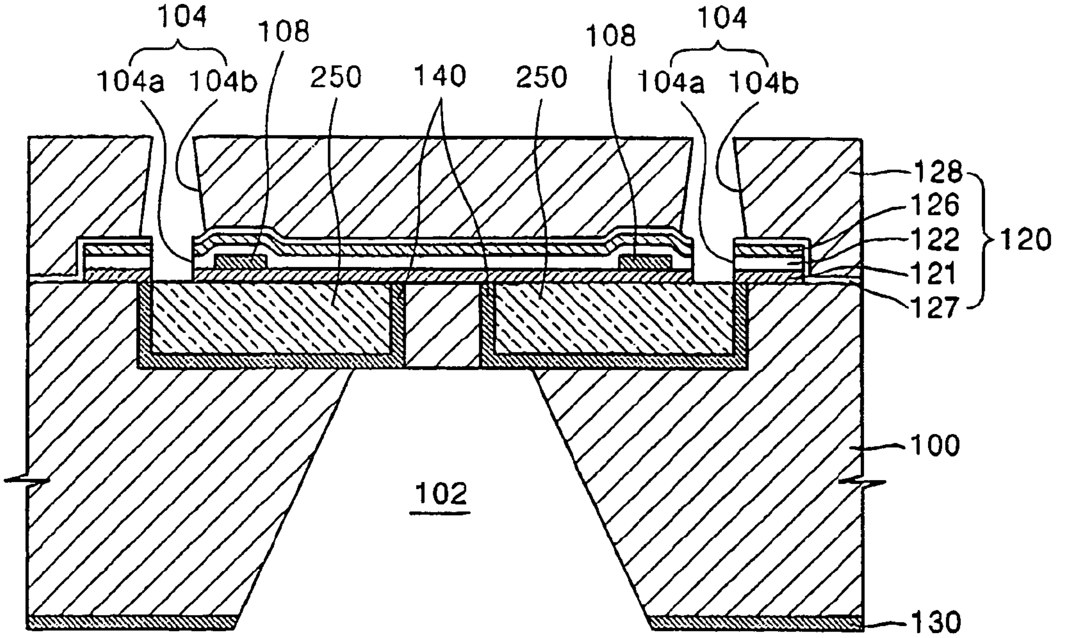

FIG. 16 illustrates a stage in which the manifold 102 is formed on a rear surface of the substrate 100. Specifically, the silicon oxide layer 130 formed on the rear surface of the silicon substrate 100 is patterned, thereby forming an etch mask which defines an area to be patterned. Next, the silicon substrate 100 exposed by the etch mask is wet etched using tetramethyl ammonium hydroxide (TMAH) or potassium hydroxide (KOH) as an etchant, thereby forming the manifold 102 having inclined sides, as shown in FIG. 16. Alternatively, the manifold 102 may be formed by anisotropically dry etching the rear surface of the substrate 100.

Figure 17:
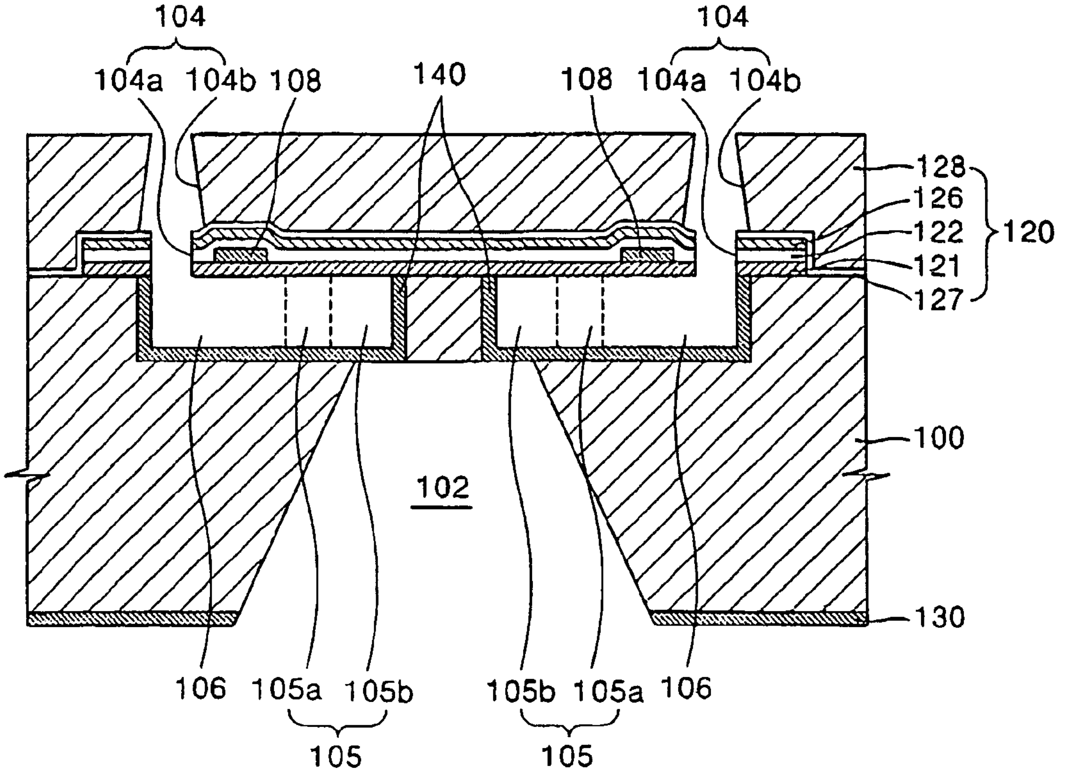

FIG. 17 illustrates a stage in which the ink chamber 106 and the ink passage 105 are formed on the front surface of the substrate 100. The ink chamber 106 and the ink passage 105 may be formed by isotropically etching the sacrificial layer (250 of FIG. 16). Specifically, the sacrificial layer (250 of FIG. 16) exposed through the nozzle 104 is dry etched using an etchant, such as $XeF_2$ gas or $BrF_3$ gas, for a predetermined amount of time. In this case, since the sacrificial layer (250 of FIG. 16) is etched isotropically, it is etched at a uniform speed in all directions from a portion exposed through the nozzle 104. However, further etching of the silicon oxide layer 140, which serves as an etch stopper, is suppressed. As shown in FIG. 17, the ink chamber 106 and the ink passage 105 are formed parallel to the surface of the substrate 100 in the same plane. Here, the depths of the ink chamber 106 and the ink passage 105 formed on the surface of the substrate 100 are about 10-80 μm. The ink passage 105 includes an ink channel 105*a* adjacent to and in flow communication with the ink chamber 106 and an ink feed hole 105*b* adjacent to and in flow communication with the manifold 102.

Figure 18:
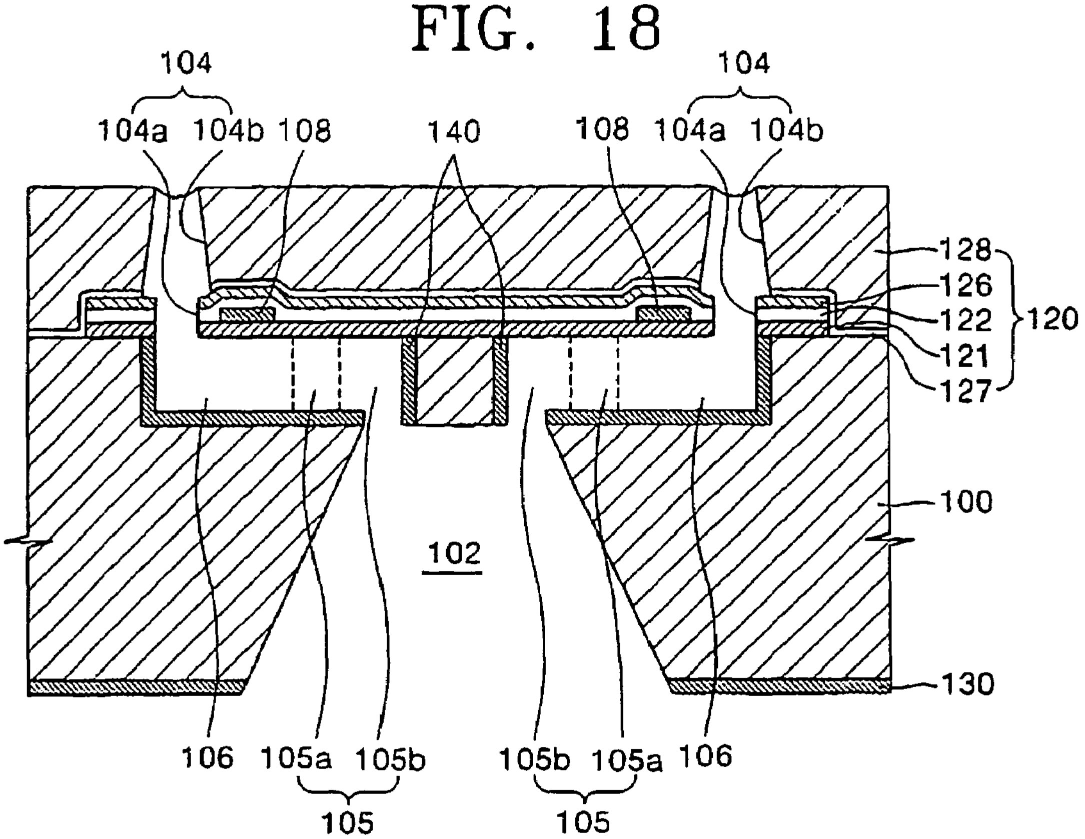

FIG. 18 illustrates a stage in which flow communication is provided between the ink passage 105 and the manifold 102, which are formed on the substrate 100. Specifically, the silicon oxide layer 140 between the ink passage 105 formed on the front surface of the substrate 100 and the manifold 102 formed on the rear surface of the substrate 100 is removed by etching, thereby providing flow communication between the ink passage 105 and the manifold 102. The ink-jet printhead according to the embodiment of the present invention is now complete.

Figure 20:
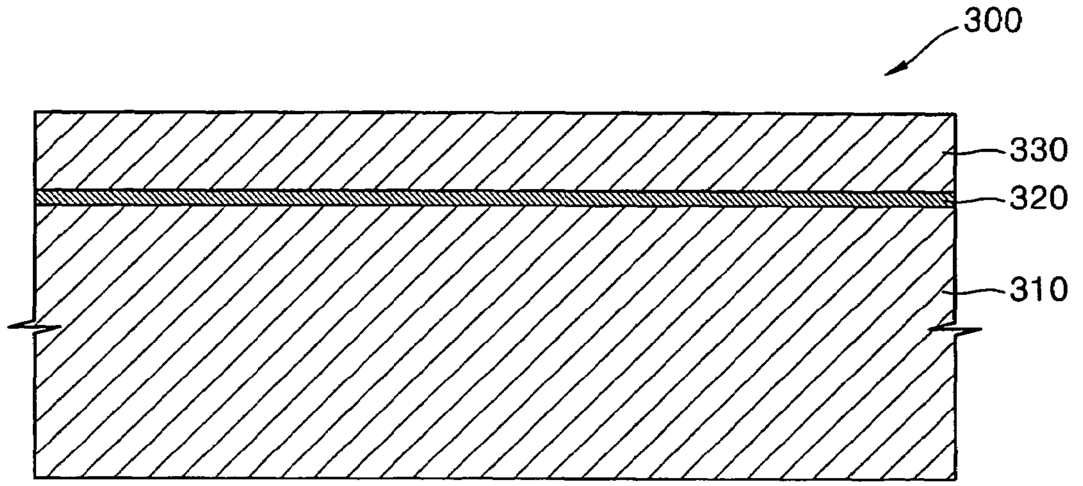
FIGS. 20 through 22 illustrate cross-sectional views of stages in an alternate method for manufacturing an ink-jet printhead according to another embodiment of the present invention.
Figure 21:
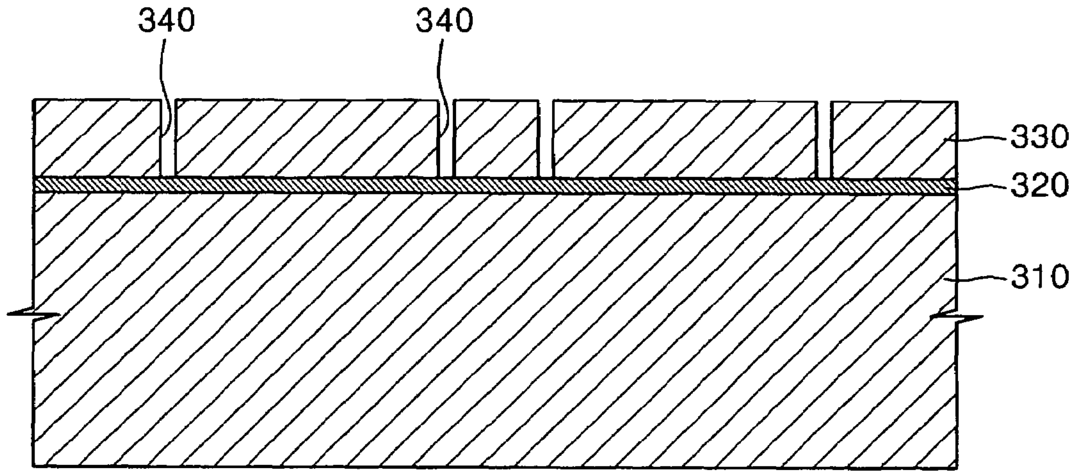
Figure 22:
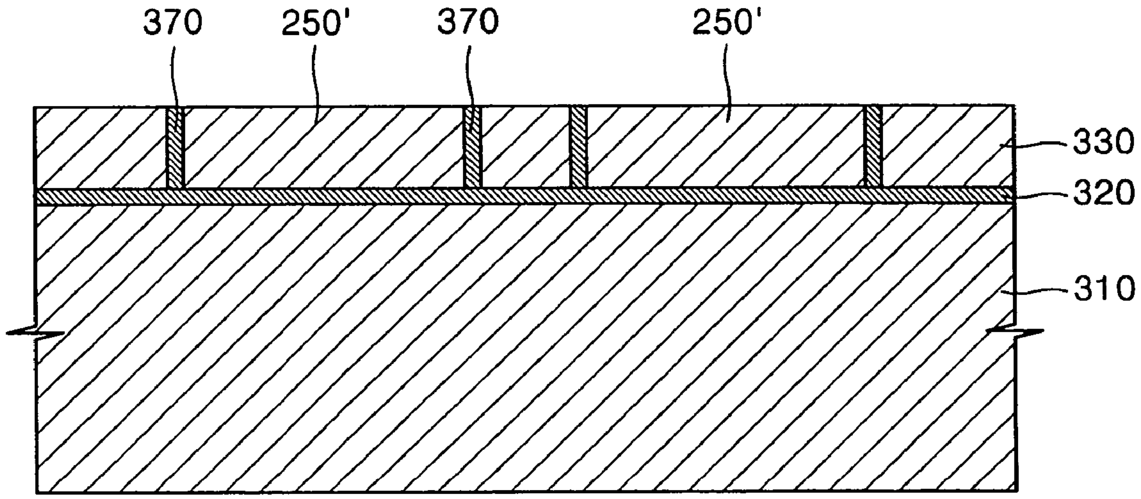

FIGS. 20 through 22 illustrate cross-sectional views of stages in an alternate method for manufacturing an ink-jet printhead according to another embodiment of the present invention. This alternate method is the same as the method of the previous embodiment, except with respect to the formation of the sacrificial layer. Thus, only the forming of the sacrificial layer will now be described.

First, as shown in FIG. 20, a silicon-on-insulator (SOI) substrate 300, in which an insulating layer 320 is interposed between two silicon substrates 310 and 330, is used as a substrate. The thickness of the upper silicon substrate 330 is about 10-80 μm, and the thickness of the lower silicon substrate 310 is about 300-700 μm.

Next, as shown in FIG. 21, the front surface of the upper silicon substrate 330 is etched, thereby forming a trench 340 having a predetermined shape so that the insulating layer 320 is exposed. The trench 340 is formed to surround portions in which the ink chamber (106 of FIG. 6) and the ink passage (105 of FIG. 6) are to be formed. The trench 340 is formed to a width of several micrometers (μms) so that it can easily be filled with a predetermined material.

Next, as shown in FIG. 22, the trench 340 is filled with a silicon oxide 370, and then, the surface of the upper silicon substrate 330 is planarized. After this planarization, portions of the upper silicon substrate 330 that are surrounded by the silicon oxide 370 become sacrificial layers 250' for forming the ink chamber (106 of FIG. 6) and the ink passage (105 of FIG. 6). Thus, the sacrificial layer 250' is formed of silicon, unlike in the previous embodiment in which it was formed of polysilicon.

Subsequent steps are the same as the above-described steps shown in FIGS. 10 through 18.

As described above, the ink-jet printhead and the method for manufacturing the same according to the present invention have several advantages. First, an ink passage is formed parallel to a front surface of a substrate in a same plane as an ink chamber, thereby preventing ejection failure caused by backflow of ink and improving performance of the printhead. Second, since a heat dissipating layer is formed to a relatively large thickness, a nozzle having a sufficient length can be obtained. Thus, the linearity of ink droplets ejected through the nozzle is improved. Third, heat generated by and remaining around a heater is efficiently dissipated to the substrate and out of the printhead. Thus, the area near the nozzle can be rapidly cooled, thereby enabling a driving frequency to be increased.

Exemplary embodiments of the present invention have been disclosed herein and, although specific terms are employed, they are used and are to be interpreted in a generic and descriptive sense only and not for purpose of limitation. For example, materials used in forming each element of an ink-jet printhead according to the present invention may be varied, methods for depositing and forming each element may be modified, and the order in which steps of a method for manufacturing the ink-jet printhead are performed may be changed. Accordingly, it will be understood by those of ordinary skill in the art that various changes in form and details may be made without departing from the spirit and scope of the present invention as set forth in the following claims.

What is claimed is:

1. A method for manufacturing an ink-jet printhead, comprising:

forming a sacrificial layer having a predetermined depth on a front surface of a substrate;

sequentially stacking a plurality of passivation layers on the front surface of the substrate, on which the sacrificial layer is formed, and forming a heater and a conductor connected to the heater between adjacent passivation layers;

forming a heat dissipating layer of metal on the plurality of passivation layers and forming a nozzle, through which ink is ejected, through the heat dissipating layer and the plurality of passivation layers to expose the sacrificial layer;

forming a manifold for supplying ink on a rear surface of the substrate;

removing the sacrificial layer to form an ink chamber and an ink passage; and providing flow communication between the manifold and the ink passage.

2. The method as claimed in claim 1, wherein forming the plurality of passivation layers comprises:

forming a first passivation layer on the front surface of the substrate on which the sacrificial layer is formed;

forming the heater on the first passivation layer;

forming a second passivation layer on the first passivation layer and the heater;

forming the conductor on the second passivation layer; and forming a third passivation layer on the second passivation layer and the conductor.

3. The method as claimed in claim 1, wherein the heat dissipating layer is formed of at least one metallic layer, and each of the at least one metallic layer is formed by electroplating at least one material selected from the group consisting of nickel (Ni), copper (Cu), aluminum (Al), and gold (Au).

4. The method as claimed in claim 1, wherein the heat dissipating layer is formed to a thickness of 10-100 μm.

5. The method as claimed in claim 1, wherein forming the sacrificial layer comprises:

etching the front surface of the substrate to form a groove having a predetermined depth;

oxidizing the front surface of the substrate in which the groove is formed to form an oxide layer; and filling the groove with a predetermined material and planarizing the front surface of the substrate.

6. The method as claimed in claim 5, wherein filling the groove with the predetermined material comprises epitaxially growing polysilicon in the groove.

7. The method as claimed in claim 1, wherein forming the sacrificial layer comprises:

forming a trench exposing an insulating layer in a predetermined shape in an upper silicon substrate of a SOI substrate; and filling the trench with a predetermined material.

8. The method as claimed in claim 7, wherein the predetermined material is silicon oxide.

9. The method as claimed in claim 1, wherein forming the heat dissipating layer and the nozzle comprises:

etching the plurality of passivation layers formed on the sacrificial layer to form a lower nozzle;

forming a lower plating mold inside the lower nozzle;

forming an upper plating mold having a predetermined shape for forming the upper nozzle on the lower plating mold;

forming the heat dissipating layer on the plurality of passivation layers by electroplating; and removing the upper and lower plating molds to form the nozzle having the upper nozzle and the lower nozzle.

10. The method as claimed in claim 9, wherein the lower plating mold and the upper plating mold are formed of a photoresist or photosensitive polymer.

11. The method as claimed in claim 9, wherein the lower nozzle is formed by dry etching the plurality of passivation layers by a reactive ion etching (RIE).

12. The method as claimed in claim 9, wherein forming the heat dissipating layer and the nozzle further comprises planarizing the top surface of the heat dissipating layer by a chemical mechanical polishing (CMP) process, after forming the heat dissipating layer.

13. The method as claimed in claim 9, wherein forming the heat dissipating layer and the nozzle further comprises forming a seed layer for electroplating the heat dissipating layer on the plurality of passivation layers.

14. The method as claimed in claim 13, wherein the seed layer is formed of at least one metallic layer, and each of the at least one metallic layer is formed by depositing at least one metallic material selected from the group consisting of copper (Cu), chromium (Cr), titanium (Ti), gold (Au), and nickel (Ni).

15. The method as claimed in claim 1, wherein the forming the heat dissipating layer and the nozzle comprises:

etching the plurality of passivation layers formed on the sacrificial layer to form a lower nozzle;

forming a plating mold having a predetermined shape for forming an upper nozzle vertically from an inside of the lower nozzle;

forming the heat dissipating layer on the plurality of passivation layers by electroplating; and removing the plating mold and forming the nozzle having the upper nozzle and the lower nozzle.

16. The method as claimed in claim 15, wherein the plating mold is formed of a photoresist or a photosensitive polymer.

17. The method as claimed in claim 15, wherein the lower nozzle is formed by dry etching the plurality of passivation layers by a reactive ion etching (RIE).

18. The method as claimed in claim 15, wherein forming the heat dissipating layer and the nozzle further comprises planarizing the top surface of the heat dissipating layer by a chemical mechanical polishing (CMP) process, after forming the heat dissipating layer.

19. The method as claimed in claim 15, wherein forming the heat dissipating layer and the nozzle further comprises forming a seed layer for electroplating the heat dissipating layer on the plurality of passivation layers.

20. The method as claimed in claim 19, wherein the seed layer is formed of at least one metallic layer, and each of the at least one metallic layer is formed by depositing at least one metallic material selected from the group consisting of copper (Cu), chromium (Cr), titanium (Ti), gold (Au), and nickel (Ni).

* * * * *